United States Patent [19]

Watson

[11] 3,826,390
[45] July 30, 1974

[54] RACK FOR ATTACHMENT TO THE TOP OF A VEHICLE

[76] Inventor: Clyde W. Watson, 1916 S.E. 6th Ave., Mineral Wells, Tex. 76067

[22] Filed: Aug. 7, 1972

[21] Appl. No.: 278,581

[52] U.S. Cl............................. 214/450, 224/42.1 F
[51] Int. Cl.............................................. B60r 9/00
[58] Field of Search.......... 214/450, 84; 224/42.1 F, 224/42.1 H, 42.45; 193/35, 37

[56] References Cited
UNITED STATES PATENTS

| | | | |
|---|---|---|---|
| 2,325,762 | 8/1943 | Ford | 224/42.1 H |
| 2,859,887 | 11/1958 | Haight | 214/450 |
| 3,058,607 | 10/1962 | Kiley | 214/450 |
| 3,251,519 | 5/1966 | Jones | 224/42.1 F |
| 3,722,766 | 3/1973 | Barrineau | 224/42.1 F |

*Primary Examiner*—Robert J. Spar
*Assistant Examiner*—John Mannix
*Attorney, Agent, or Firm*—Wayland D. Keith

[57] ABSTRACT

A rack for attachment to the top of a vehicle, on which rack elastomer elements receive the ladder or other elements being hauled. The rollers of which rolling element are positioned on a longitudinal shaft along the side of the vehicle top and on a lateral shaft on each end of the rack to enable a ladder, boards, pipe or like elongated material to be readily loaded onto the rack without injury thereto or to the top of the vehicle, and enables such material to be hauled. A special feature is the provision of a projection which may extend upward between the rungs of a ladder to prevent longitudinal movement of the ladder. Furthermore, a clamping device is provided to prevent longitudinal movement of a ladder and/or other material being hauled. An upstanding corner shaft, having an elastomer roller journaled thereon is provided on the rack, near the distal end thereof, which enables an element, being hauled, to be moved thereaganist in rolling relation with the roller thereon, so as to expedite the work involved in loading the rack. The rack is removable and replaceable. The elastomer rollers provide a cushion between the ladder and/or other material being hauled and the mounting frame on the vehicle so as to prevent damage to the ladder or other material being hauled to prevent shock to the vehicle.

5 Claims, 7 Drawing Figures

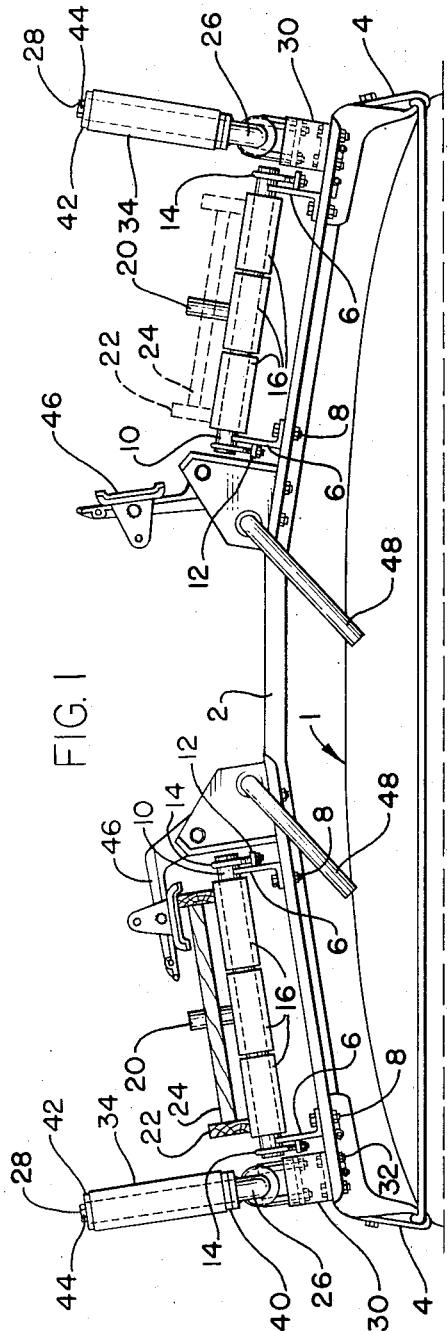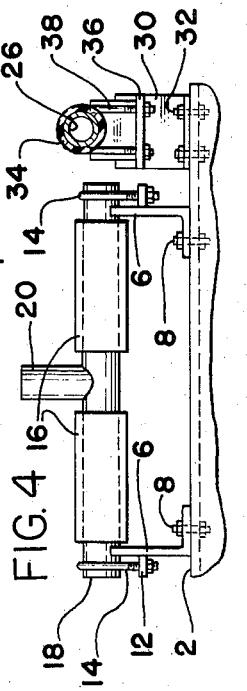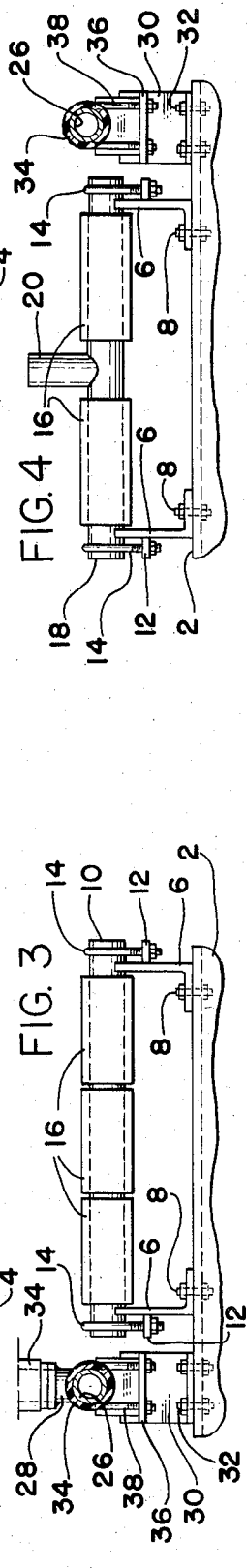

RACK FOR ATTACHMENT TO THE TOP OF A VEHICLE

SUMMARY OF THE INVENTION

A rack for the top of a vehicle, which rack is for carrying tools and materials thereon. The rack has a series of elastomer covered rollers mounted on a longitudinal shaft which extends along the longitudinal side of the vehicle top. The rollers are free to roll individually on the shaft. A roller is journaled on an upstanding shaft on the distal end of the rack, and other elastomer rollers are arranged on lateral shafts, one at each end of the vehicle top. The shafts are properly supported on a structural member so as to be above the top of the vehicle. The rack is so constructed that it can be readily removed from and replaced onto the top of the vehicle without damage thereto.

Conventional load clamping members may be used to clamp tools and/or material being hauled onto the rack. However, if a ladder is being hauled, a projection, on the forward lateral shaft, may be swung upward by rotation of the shaft, so that the projection extends between the rungs of the ladder, thereby to prevent longitudinal movement of the ladder. To haul other material on the rack, the projection may be swung downwardly, by rotation of the lateral shaft, and U-bolts utilized to clamp the shaft so that the projection on the shaft will be in the desired position.

The racks are made in individual units for the right and left sides of the vehicle top, and either one or two racks may be used on a vehicle. The rack is so constructed that it may be readily disassembled for shipment or for removal and replacement of the elastomer rollers, and the rack may just as readily be reassembled.

OBJECTS OF THE INVENTION

An object of this invention is to provide a rack for attachment to the top of a vehicle, on which to haul tools and/or materials, which rack has elastomer covered rollers thereon to minimize noise and to prevent damage to the vehicle and to the tools and/or material being hauled.

Another object of the invention is to provide a rack for attachment to the top of the vehicle, which rack has a multiplicity of journaled, elastomer rollers on a longitudinal shaft, which shaft extends along the side of the vehicle top, with other rollers journaled on lateral shafts near each end of the longitudinal shaft, with the upper faces of the longitudinally arranged elastomer rollers being at a higher elevation than the lateral rollers.

Still another object of the invention is to provide hollow shafts, longitudinally and laterally of the vehicle top, which shafts have relatively short, closely spaced, elastomer rollers thereon, and an upstanding shaft having an elastomer roller thereon, which upstanding shaft is on the outer side of the rack near the distal end thereof.

Yet another object of the invention is to provide a rack for attachment to the top of a vehicle, which rack is so clamped together that it may be readily assembled or disassembled for repair, shipment, and/or storage.

Still a further object of the invention is to provide a rack for attachment to the top of a vehicle, the elastomer rollers of which rack are so arranged that the rack can be loaded by a single individual.

Still a further object of the invention is to provide a rack for attachment to the top of a vehicle, which rack is simple in construction, low in the cost of manufacture, easy to assemble and to disassemble, and effective in use.

BRIEF DESCRIPTION OF THE DRAWINGS

With the above objects in mind and others which will become manifest as the description proceeds, reference is to be had to the accompanying drawings in which like reference characters designate like parts in the several views thereof, in which:

FIG. 1 is a rear elevational view of the upper portion of a vehicle top, showing a rack mounting frame attached thereto, with racks mounted on the mounting frame, with a ladder, shown in full outline, clamped in one of the racks and showing the other of the racks with the ladder being shown in dashed outline, as positioned thereon, with the clamping means in open position;

FIG. 2 is a side elevational view of the upper portion of the vehicle top, on a reduced scale from that shown in FIG. 1, showing two racks mounting frame thereon with a rack mounted on the rack mounting frame, a ladder or material, shown in dashed outline, positioned on one of the racks, the clamping means being shown in open position;

FIG. 3 is a sectional view, on an enlarged scale, taken on the line 3—3 of FIG. 2, looking in the direction indicated by the arrows, showing only a fragmentary portion of the rack mounting frame, and showing the upper portion of the upright roller removed;

FIG. 4 is a sectional view taken on the line 4—4 of FIG. 2, on an enlarged scale, looking in the direction indicated by the arrows; showing only a fragmentary portion of the rack mounting frame;

FIG. 6 is a fragmentary view of one side of the vehicle top, showing a rack mounting frame with one rack mounted thereon, in full outline, as used for carrying ladders, and showing the upright projection on the forward hollow shaft in upright position, in full outline the horizontal position of the projection being shown in dashed outline, the position used for carrying other materials, such as boards, pipe or the like;

DESCRIPTION OF THE INVENTION

Figure 5:
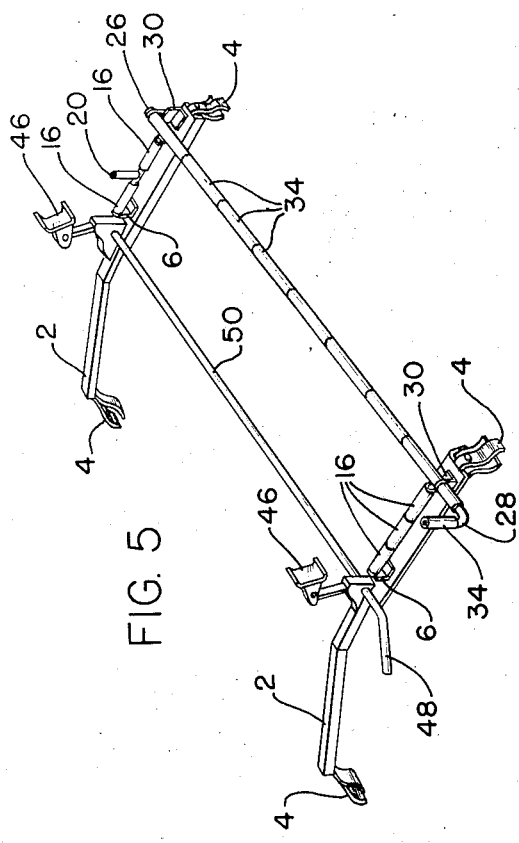
FIG. 5 is a perspective view of the rack mounting frame shown apart from the vehicle top, and showing only one rack thereon, with the clamping arrangement being shown in open position, showing an upright projection on the forward hollow, lateral shaft in upright position in full outline, for carrying a ladder thereon.

With more detailed reference to the drawing, the numeral 1 designates generally a vehicle top having front and rear mounting frames 2 secured thereto, as by means of clamps 4, or by welding, if a permanent installation is desired. Upstanding support brackets 6, each of which have saddle notche formed in the upper end thereof, are secured to the rear mounting frame 2, as by bolts 8, to position a lateral, hollow shaft 10 in the saddle notches, in upright support brackets 6. Each of the support brackets 6 has an outwardly extending, apertured lug 12 thereon, which may be molded therewith or secured thereto as by welding. U-bolts 14 are provided, to partially surround each end of shaft 10 and to pass through apertured lugs 12 and are bolted into binding engagement with the shaft 10 and with the upstanding brackets 6.

Prior to mounting the shaft 10 on the brackets 6, elastomer rollers 16, which may be of polyurethane or the like, are fitted on the hollow shaft 10. The rollers 16 are positioned on the shaft in such manner as to be close together but each roller rolls freely and independently on the shaft.

Figure 6:
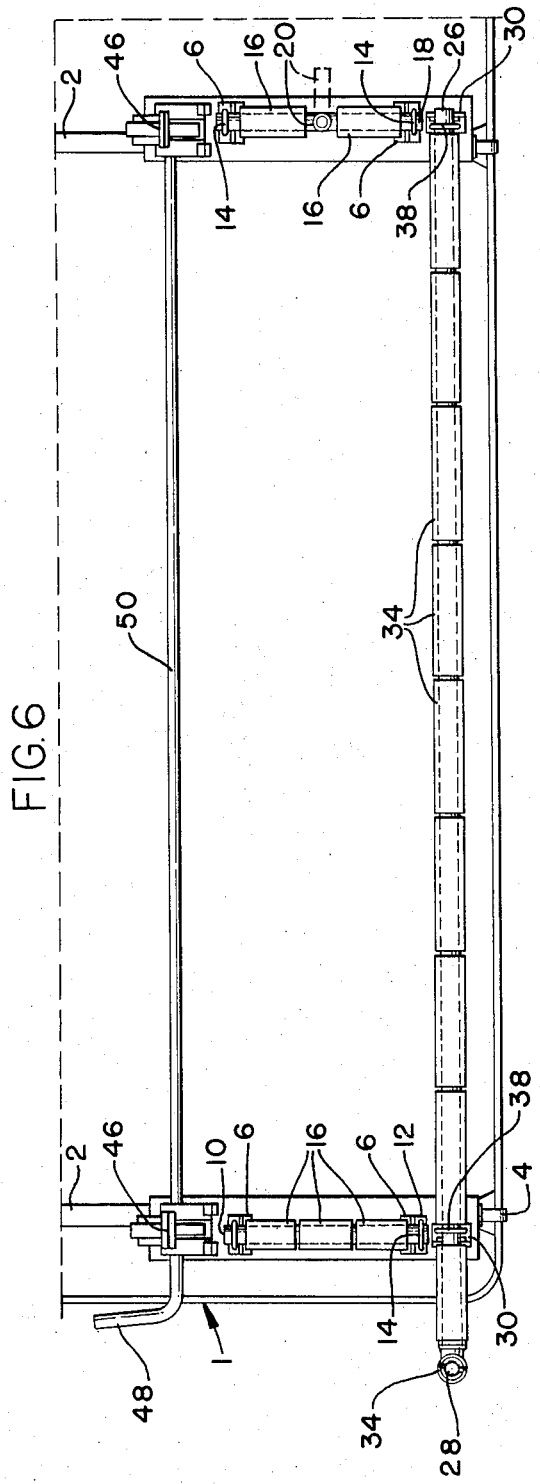

As best seen in FIGS. 4, 5 and 6, brackets 6, which are similar in construction to the aforementioned brackets 6, are secured to the rack mounting frame 2 by means of bolts 8, so as to support the hollow shaft 18 a spaced distance above the mounting frame 2. Elastomer rollers 16 are positioned on the hollow shaft 18, so that a roller 16 is on each side of an outwardly extending projection 20, which projection may be used, in the position as shown in full outline in FIGS. 1, 2, 4, 5 or 6, to prevent longitudinal movement of a ladder 22, as the projection 20 extends between rungs of the ladder.

However, when it is desired to use the rack for hauling materials, other than ladders, such as boards, pipe or the like, the U-bolts 14 are loosened and the shaft 18 is rotated at least 90° to move the projection 20 from the position, as shown in full outline in FIGS. 2 and 6 to the dashed outline position therein. The clamps or U-bolts 14 are then tightened to hold the projection 20 in the position shown in dashed outline, which will permit other material to be hauled on the rack, without scuffing the material or damaging the rack or the vehicle.

Figure 7:
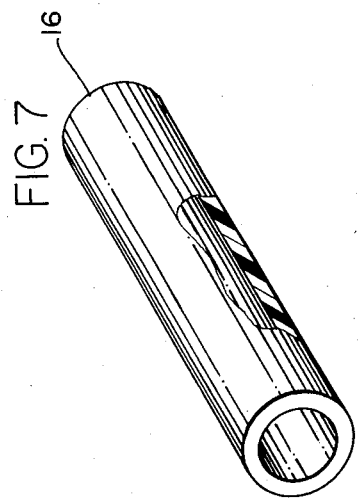
FIG. 7 is a perspective view of one of the elastomer rollers removed from the hollow shaft, with a portion thereof being broken away and with portions being shown in section to bring out the details of construction.

A hollow, longitudinal shaft 26, with an upstanding end portion 28, is secured in place on lugs 30 on the rack mounting frame 2. The upstanding lugs 30 are secured to the rack mounting frame 2 by bolts 32. These lugs 30 are saddled to complementally receive the hollow, longitudinal shaft 26 therein. A multiplicity of elastomer rollers 16 and 34, indicated as being of plastic in FIGS. 3, 4 and 7, are positioned on the respective shafts 18 and 26 and are independently rotatable thereon to enable a ladder, or material, such as pipe, boards or the like, to be moved on the rack, which rack is secured to the roof of a vehicle. The elastomer rollers also prevent damage to tools and or materials being loaded onto the racks. The upstanding lugs 30 are mounted near the outer side of each rack mounting frame member 2. Each of the upstanding lugs 30 has an outstanding, apertured lug 36 molded integral therewith or secured thereto, as by welding. Each lug 36 receives a U-bolt 38 therethrough to secure the shaft 26 against longitudinal and rotational movement. The shaft 26 is upturned, as indicated at 28, which upturned portion 28 has an elastomer roller 34 mounted thereon, which roller is secured against downward movement by washers 40 welded thereto, and which roller 34 is secured against upward movement by a washer 42 fitted thereabove and a pin 44 which passes through the upstanding portion 28 of hollow shaft 26, above the washer 42.

By removing the pin 44 and washer 42, the elastomer roller 34 may be removed from the upstanding portion 28 of shaft 26, and by removing the U-bolts 38 from the apertured lugs 36, the elastomer rollers may be removed from shaft 26, thereby to enable complete replacement of the elastomer rollers, as set out above for the elastomer rollers 16, which may be replaced on shafts 10 and 18 in like manner.

A clamp 46 is secured to each rack mounting frame member 2, on the inner side thereof, which clamps are in aligned relation, so by operating a lever 48, which is connected to the shaft 50, the shaft 50 is rotated to move each clamping member 46 into clamping relation with or out of clamping relation, as desired, in a manner well known in the art of clamps. These clamps may be purchased commercially and form no part of the invention other that the combination thereof with the other elements of the rack. The clamping arrangement is adjustable and may be procured in various sizes to accomodate various conditions. One of the clamps 46 is shown in FIG. 1 in open position and the other of the clamps 46 is shown therein in closed position.

The various shafts are hollow so that the weight of the rack will not be so great, and the roller 34 acts as a guide and a bumper, so that elongated elements may be loaded onto the rack by a single individual.

While the invention has been described in some particularity with respect to present structure, it is to be understood that variations may be made in the materials used, if they will obtain the desired results, and modifications made to adapt the rack to various applications, without departing from the scope and intent of the invention as claimed.

What is claimed is:
1. A rack for attachment to the top of a vehicle body, which rack comprises;
   a. a rack mounting frame comprising a pair of transverse members, one extending across the vehicle top, a spaced distance thereabove, near each end thereof,
      1. each mounting frame member being secured, near the extremities thereof, to the vehicle top,
   b. spaced apart shaft support means mounted on each said transverse mounting frame member to support shafts longitudinally and laterally with respect to the vehicle top,
   c. a shaft mounted longitudinally of the vehicle top on said shaft support means,
      1. means securing said longitudinal shaft against longitudinal and rotary movement,
      2. said longitudinal shaft has an upturned portion on an end thereof,
      3. an elastomer roller journaled on said upturned portion of said shaft,
      4. washer means secured on said shaft to restrain said elastomer roller against longitudinal movement,
   d. a lateral shaft mounted on said shaft support means on each said mounting frame member,
      1. means for selectively securing said lateral shaft against longitudinal and rotary movement,
   e. elastomer rollers journaled on said shafts for guiding material onto said rack to be supported thereby.

2. A rack for attachment to the top of a vehicle, as defined in claim 1; wherein
   a. said elastomer rollers on said longitudinal shaft are positioned at a higher elevation than the adjacent ends of said elastomer rollers on said lateral shafts.

3. A rack for attachment to the top of a vehicle, as defined in claim 1; wherein
 a. each said shaft having a plurality of elastomer rollers journaled thereon,
 b. at least one of said lateral shafts has a projection thereon,
 c. said shaft being selectively rotatable when said shaft is in one position,
 d. said shaft being selectively rotatable so said projection will be approximately horizontal with respect to said shaft, when said shaft is in another position,
 e. one said elastomer roller being journaled on said lateral shaft on each side of said projection.

4. A rack for attachment to the top of a vehicle, as defined in claim 2; wherein
 a. said shafts mounting said elastomer rollers are hollow shafts,
 b. said elastomer rollers on said hollow shafts are plastic rollers.

5. A rack for attachment to the top of a vehicle as defined in claim 3; wherein
 a. said plurality elastomer rollers are fitted on said shafts in substantially end to end relation, so as to cover the greater portion of the surface of said shafts,
 b. rollers on each said shaft being usable independently of other of said rollers, while in place.

* * * * *